United States Patent

Stache et al.

[11] 3,859,272
[45] Jan. 7, 1975

[54] 19-ALKYLENE-14-β-HYDROXY-CARDENOLIDE DERIVATIVES AND PROCESS FOR PREPARING THEM

[75] Inventors: Ulrich Stache, Hefheim Taunus; Werner Fritsch, Neuenhain Taunus; Werner Haede, Hefheim Taunus; Kurt Radscheit; Ernat Lindmer, both of Frankfurt am Main, all of Germany

[73] Assignee: Farbwerke Hoechst Aktiengesellschaft Vormals Meister Lucius & Bruning, Frankfurt am Main, Germany

[22] Filed: July 7, 1972

[21] Appl. No.: 269,612

Related U.S. Application Data

[63] Continuation of Ser. No. 842,352, July 16, 1969, abandoned.

[30] Foreign Application Priority Data

July 23, 1968 Germany............................ 1793009

[52] U.S. Cl.......... 260/210.5, 424/182, 260/239.55, 260/239.57, 260/239.55 R, 260/239.57
[51] Int. Cl............................................. C07c 173/00
[58] Field of Search..... 260/210.5, 260/239.55 R, 260/239.57

[56] References Cited
UNITED STATES PATENTS

| | | | |
|---|---|---|---|
| 3,102,127 | 8/1963 | Bowers............................. | 260/239.55 |
| 3,309,387 | 3/1967 | Furst et al....................... | 260/239.57 |
| 3,398,138 | 8/1968 | Lefebvre et al................. | 260/210.5 |
| 3,642,770 | 2/1972 | Haede et al...................... | 260/210.5 |

*Primary Examiner*—Lewis Gotts
*Assistant Examiner*—Cary B. Owens
*Attorney, Agent, or Firm*—Curtis, Morris & Safford

[57] ABSTRACT

Cardiotonically active 19-alkylene-14 β-hydroxy-cardenolides of the formula

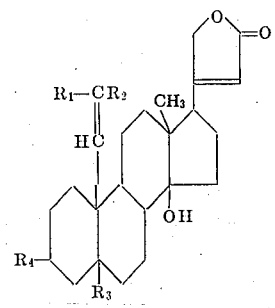

wherein $R_1$ taken alone is $-CH$, $-CO_2R_5$, $-CON(R_6)_2$, $-CH(OR_6)_2$, $-C_6H_5$, $-CH=CH_2$, or $-SCH_3$, or, taken together with an $-OH$ group in the $R_3$-position, forms a lactone ring; $R_2$ is $-H$, $-CH_3$, $-F$, $-Cl$, $-Br$, or $-I$; $R_3$ is $5\alpha-H$, $5\beta-H$, or $5\beta-OH$; $R_4$ is $-OH$, substituted or unsubstituted 3-pyranyl ether, or a 5-or 6-membered substituted or unsubstituted cyclic glycoside; $R_5$ is $-H$, $-CH_3$, $-C_2H_5$, $-C_3H_7$, $-C_4H_9$, $-C_5H_{11}$, or $-CH_2-C_6H_5$; and $R_6$ is $-CH_3$ or $-C_2H_5$, or, when $-CH(OR_6)_2$ is a cyclic acetal, the $R_6$'s together are $-CH_2CH_2-$ or $-CH_2C(CH_3)_2CH_2-$. A process for preparing these compounds from the corresponding 19-oxo-14β-hydroxy cardenolides.

1 Claim, No Drawings

19-ALKYLENE-14-β-HYDROXY-CARDENOLIDE DERIVATIVES AND PROCESS FOR PREPARING THEM

This is a continuation of application Ser. No. 842,352 filed July 16, 1969 (now abandoned).

The present invention relates to new 19-alkylene-14β-hydroxy-cardenolides and to a process for preparing same.

More particularly the invention relates to 19-alkylene-14β-hydroxy-cardenolides of the formula I

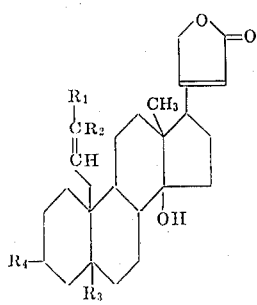

wherein $R_1$ taken alone is —CN, —$CO_2R_5$, —CON($R_6$)$_2$, —$C_6H_5$, —CH=$CH_2$, or —$SCH_3$, or, taken together wtih an —OH group in the 3-position, forms a lactone ring; $R_2$ is —H, —$CH_3$, —F, —Cl, —Br, or —I; $R_3$ is 5α—H, 5β—H, or 5β—OH; $R_4$ is —OH, a substituted or unsubstituted 3-pyranyl ether or a 5-or 6-membered cyclic glycoside; $R_5$ is —H, —$CH_3$, —$C_2H_5$, —$C_3H_7$, —$C_4H_9$, —$C_5H_{11}$, or —$CH_2$—$C_6H_5$; and $R_6$ is —$CH_3$ or —$C_2H_5$, or, when —CH(O$R_6$)$_2$ is a cyclic acetal, the $R_6$'s together are —$CH_2CH_2$— or —$CH_2C(CH_3)_2CH_2$—. The invention also relates to a process wherein 19oxo-14β-hydroxy-cardenolides of the general formula II

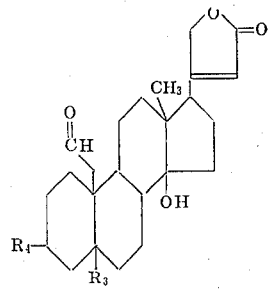

in which $R_3$ and $R_4$ have the meanings given above, are reacted with anions of alkyl-dialkyl-phosphonates having the formula III

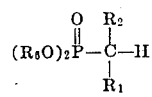

wherein $R_1$, $R_2$ and $R_6$ are defined as above, in an inert waterfree solvent or mixture of such solvents. The 19-alkylene-14β-hydroxy-cardenolides wherein $R_4$ is —OH that may be obtained as aglucones are converted with optionally substituted dihydropyranes, glycals or α-bromo-pyranoside into the correspondingly substituted 3-pyranylether or glycoside derivatives. The acyl groups present in the 3-pyranyl radicals or glycoside radicals are optionally saponified.

The smooth reaction of the 19-aldehyde group of the 14β-hydroxy-cardenolides with the strongly basic-active anion of the phosphonic acid ester proceeds without side reactions in the sense of an PO-activated olefination according to Horner (cf. Chem. Ber. 92, 2499 (1959)). This is most surprising, for the state of the art suggests that the butenolide ring in the 17β-position would under the influence of bases quickly undergo chemical rearrangement into other structures which have no cardiac action.

In the presence of a 14β-hydroxyl group, which is essential for the cardiac activity of the cardenolide derivatives for example, the 17β-butenolide ring reacts in a basic medium with the 14β-hydroxyl group whereby secondary products without cardiac effect are formed. Thus, for example k-strophanthidin is converted with bases into the ineffective isostraphanthidin.

Considering these findings it is highly surprising that the phosphonate anion known for its strong basicity does not effect conversions of the 17β-butenolide ring or 14β-hydroxyl-group, but first reacts selectively with the 19-aldehyde group only. Moreover, there has to be taken into consideration the strong steric hindrance of the angular 19-aldehyde group, so that undesirable side reactions would have to be expected with the aldehyde groups sensitive toward alkalis.

The process of the invention proceeds, for example, with the use of k-strophanthidine according to the following formula scheme

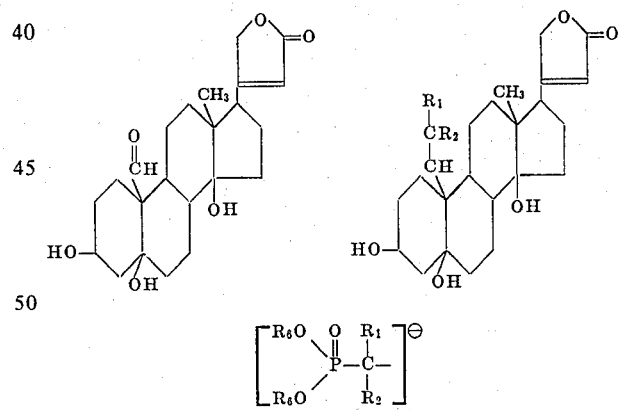

The cardenolides or cardioglycosides of the cardenolide series required as starting substances in the process of the invention are known compounds that are prepared from vegetable materials according to known methods.

As starting materials in the present process, for example the following cardenolide derivatives may be used: k-strophanthidin and its 3-glycosides, for example, convallatoxin, cymarine, k-strophanthin-β, k-strophanthin-α, k-strophanthoside; cannogenin or its 3-glycosides, corotoxigenin and its 3-glycosides, furthermore 3-acylates or 3-tetrahydropyranylethers of the cited aglucones.

As glycosides, mono-, di- or trisaccharides may be employed whose OH-groups may be methylated or acylated by means of aliphatic or aromatic acyl groups, in particular acetyl or benzoyl groups. By way of example the following may be named: L-rhamnoside, D-glucoside, D,L-thevetoside, L-cymoroside, D-galaotoside, D-digitoxoside, D-fuccside, L-talomethyloside, D-allomethyloside, D-digitaloside, D,L-oleandroside, D-boiviloside.

The pyranylethers also may contain acyl or methyl substituents or may be etherified with other pyrane molecule.

As phosphonates there are used for example cyanomethyl-, dimethyl- or diethylphosphonate, [α-methyl-cyanomethyl]-, diethylphosphonate, carbomethoxymethyl phosphonate, carboethoxymethyl phosphonate, carbbbenzoxymethyl-dimethyl- or diethylphosphonate,

[α-methyl-carbethoxy-methyl]-diethylphosphonate,
[α-fluoro-carbethoxy-methyl]-diethylphosphonate,
[α-chloro-carbethoxymethyl]-diethylphosphonate,
[α-bromo-carbethoxy-methyl]-diethylphosphonate,
[α-iodo-carbethoxymethyl]-diethylphosphonate,
1,1-diethoxy-ethyl-diethylphosphonate,
allyl-diethylphosphonate,
benzyl-diethylphosphonate, thiomethoxymethyl-diethylphosphonate, carbamido-methyl-diethylphosphonate and N,N-dimethylcarbamido-methyl-diethylphosphonate.

The phosphonates in question can, by way of example, be prepared by reacting alkyl radicals correspondingly halogenated in the α-position with triethyl phosphite in known manner.

As bases, especially alkali metal- or alkaline earth metal hydrides or -amides, moreover alkali metal or alkaline earth metal alcoholates, preferably sodium hydride or potassium hydride, sodium or potassium amide, sodium tert. butylate or potassium tert. butylate may serve.

As inert solvents, alcohols, hydrocarbons, preferably aprotic solvents such as for example ethers (tetrahydrofurane, dioxane, dimethoxyglycol diglym) or dimethylformamides or dimethylsulfoxide or mixtures thereof are used.

To carry out the process of the invention, 1 mol-equivalent of a derivative of 14β-hydroxy-cardenolide is dissolved or suspended in one of the said solvents, preferably a non-prototropic solvent. Subsequently, at 0°–30°C a solution of 1–10, preferably 1–4, mol-equivalents of the alkali metal- or alkaline earth metal compound of one of the phosphonates cited in one of the specified solvents, preferably a non-prototropic solvent, is added, if required while cooling. The alkali metal- or alkaline-earth metal phosphonates are prepared in known manner. An especially advantageous method of carrying through the process of the invention consists in placing a stoichiometric amount of sodium hydride in one of the mentioned solvents, for example tetrahydrofurans or dioxane, and adding dropwise one of the cited phosphonates until the sodium hydride has dissolved or H$_2$ formation ceases.

Subsequently, the reaction solution is stirred at between −40°C and the boiling point of the solvent employed, preferably at temperatures ranging from 0°C to 50°C. The reaction times may vary between one minute and periods of about 72 hours. Generally, the reaction is complete within 30 minutes to 7 hours. It is likewise possible to proceed inversely, adding the steroid component solution or suspension to the solution of the alkali metal of alkaline-earth metal phosphonate. Yet another alternative consists in suspending the base, preferably an alkali metal hydride or amide, in the solution or suspension of the 19-oxo-cardenolide of the cited aprotic solvents, preferably an ether, subsequently adding the phosphonate and further treating the reaction mixture as usual.

The highest yields (up to 90 percent of the theory) are achieved when the operation proceeds, inasfar as possible, under non-prototropic reaction conditions.

The products of the invention are isolated in the usual manner. After completion of the reaction, the reaction mixtures are introduced into sodium chloride-containing water. Thereby, products of the invention have a sufficient solubility in lipoids precipitate in solid or oily form. Water-soluble products of the invention are thus dissolved to a large extent. If the products cannot be separated by filtration, they are isolated for example by extraction with a solvent insoluble in water, for instance chloroform or methylene chloride, to which, advantageously, a small amount of a lower alcohol is added. After decanting the solvent the products separated in solid or oily form and can, generally, be obtained by recrystallization or reprecipitation in pure crystallized or amorphous form. The products may likewise be obtained in pure form by means of chromatography.

The products so-obtained may, unless the process already started with cardenolide aglucones, be converted into aglucones in known manner.

If aglucones are obtained as end products they can be converted with dihydropyranes or glycales which may carry methyloxy or acyloxy groups into the corresponding 3-pyranoside derivatives, or with α-bromo-acyloxy or α-bromobenzoxy pyranoses into the corresponding 3-pyranoside derivatives. The 3-[acetoxy]-pyranosides thus obtained can be hydrolyzed by known methods, for example by means of alkali metal carbonates or alkali metal bicarbonates or ammonia to form the corresponding 3-hydroxy-pyranosides without damage to the sensitive 14β-hydroxy-17β-butenolide grouping. Under the described conditions only the acetoxy-groups in the pyranoside portion of the 19-carboalkoxyalkylene-cardenolide-3-[aceteoxy]-pyranosides of the invention are hydrolyzed.

According to the process of the invention, for example, the following compounds are obtained:
19-carboxymethylene-periplogenin-5β-lactone, 19-carboxy-[α-fluor]-methylene-periplogenin-5β-lactone, 19-carboxy-[α-methyl]-methylene-periplogenin-5β-lactone, 19-[N,N-dimethylcarboamide]-methylene-periplogenin, 19-carboamidomethylene-periplogenin, 19-carbomethoxymethylene-digitoxigenin, 19-carbethoxymethylene-digitoxigenin and 19-carbobenzoxymethylene-digitoxigenin, 19-carbomethoxy-[α-methyl]-methylene digitoxigenin as well as 19-carbobenzoxy-[α-methyl]-methylene-digitoxigenine, 19-[N,N-dimethyl-carboamido]-methylene digitoxigenine, 19-carbomethoxymethylene-uzarigenin, 19-carboethoxy-methylene-uzarigenin and 19-carbobenzoxymethylene-uzarigenin, 19-cyanomethyleneuzarigenin, 19-carbomethoxy-[α-fluor]-methylene as well as 19-carbobenzoxy-[α- fluoro]-methylene-uzarigenin, 19-carbomethoxy-[α-methyl]-methylene and b 19-carbobenxozy-[α-methyl]-methylene-uzarigenin, 19-[N,N-dimethylcarbhoamido]-methylene-uzarigenin as well as 3-acylates, 3pyranylethers and 3-glycosides of the above 19-alkylene-cardenolide genins.

The products of the invention exhibit valuable cardiotonic activities, for example a high positive intropic effect. Thus the 19-carboalkoxymethylene-14β-hydroxy-cardenolides show a high enteral resorption rate (>30 %) on oral administration in animal tests with regard to their positive inotropic activity even when the 19-oxo-cardenolides from which they are derived for example, k-strophanthidin, show a very low enteral resorption rate (<10 % only).

Furthermore, the aglucones of these cardenolides show a long lasting adherence on the heart muscle which, as regards the duration of the effect, corresponds to that of strophanthin in the order of magnitude. This is very surprising, for hitherto it was accepted that all known pharmacologically tested aglucones of cardioglucosides display only poor adherence on the myocardium contrary to their 3-glucosides.

The products of the invention may, moreover, serve as intermediates for the manufacture of further valuable cardenolide derivatives.

The melting points were determined on a Kofler block uncorrected. The infrared spectra were taken in KBr, the UV spectra in methanol.

The following examples are to illustrate the invention but they are not intended to limit it thereto the parts and percentages being by weight unless otherwise stated.

EXAMPLE 1 a. To a suspension of 36 mg of sodium hydride in 4 ml of abs. tetrahydrofurane, 330 mg of cyanomethyl-diethylphosphonate were added dropwise while stirring and cooling. After the $H_2$ formation had ceased, the reaction solution was introduced into a solution of 300 mg of k-strophanthidin in 4 ml of tetrahydrofurane. After stirring for two hours at 25°c, the reaction mixture was poured into water and extracted several times with methylene chloride. The combined organic extracts were washed once with water and dried. After distilling off the solvent in vacuo, an oil was obtained which crystallized after solution in acetone/ether. After filtering off and washing the crystals with ether, 274 mg of 19-cyanomethylene-periplogenin were obtained melting at 210° – 212°C.

UV bands: λmax = 215 – 216 $\mu$, $\epsilon$= 24700 typical IR bands: at 3440, 2215, 1775, 1730, 1615 cm$^{-1}$ no more bands at 2740 – 1750 cm$^{-1}$.

b. To a solution of 22 mg of sodium in 3.5 ml of absolute ethanaol, 0.4 ml of cyanomethyl-diethylphosphonate were added. After stirring for 10 minutes at 22°C, 200 mg of solid k-striphanthidin were introduced into the mixture. Stirring was continued at 22°C for 2 hours and the mixture was then poured into water. The usual work-up by extraction with methylene chloride as under a) yielded an oil which partially crystallized after digest with ether. The crystals were separated by filtration. By repeated recrystallization in acetone/ether there was obtained a product analogous to that described in Example 1a) (32 mg) having a melting point of 209° – 211°C.

EXAMPLE 2

19-carboxymethylene-periplogenin-5β-lactone a. 3.2 ml of carbomethoxymethyl-diethylphosphonate were added dropwise to a suspension of 345 mg of sodium hydride in 19 ml of absolute tetrahydrofurane while stirring and cooling. When $H_2$ formation had ceased, said solution was added to a solution of 2 g of k-strophanthidin in 30 ml of absolute tetrahydrofurane and 20 ml more of absolute tetrahydrofurane were added. After stirring for 35 minutes at 23°C, the reaction mixture was poured into 400 ml of water and extracted 5 times with chloroform; the extracts were washed with water, dried and the solvent was distilled off. The remaining oil was dissolved in acetone/ether. After some time the product which, generally, precipitated again in oily form, crystallized completely. The crystals were filtered off whereby 1.8 g of 19-carbomethoxy-methyleneperiplogenin having a melting point of 240° – 245°C (after previous sintering) were obtained.

UV: λmax = 215 $\mu$, $\mu$= 24 400 typical IR bands: at 3460 (frequently also preliminary bands at 3560 cm$^{-1}$), 1770, 1710-1730 (broad), 1615, three weak but typical continuous bands at 1290, 1270 and 1250 cm$^{-1}$, no more bands at 2740 – 2750 cm$^{-1.}$ b. 0.35 ml of carbomethoxy-methyl-diethylphosphonate were added dropwise to a suspension of 36 mg of sodium hydride in abs. tetrahydrofurane while stirring and cooling. When $H_2$ formation had ceased, said solution was added to a solution of 300 mg of k-strophanthidin in 4.2 ml of abs. tetrahydrofurane and 2 ml more of absolute tetrahydrofurane were added. After refluxing for 2 hours and cooling the reaction mixture, workup was effected as described under a). After recrystallizing twice from acetone/ether, 138 mg of 19-carboxymethylene-periplogenin-5β-lactone were obtained, the data being the same as indicated under a).

EXAMPLE 3 a. To a solution of 1 g of 19-carboxymethylene-periplogenine-5-lactone in 5 ml of abs. tetrahydrofurane, 0.7 ml of 6-hydroxy-methyl-tetrahydropyrane-acetate and one droplet of phosporoxy chloride were added. After the reaction mixture had been allowed to stand for 6 hours at 20°C, it was poured into excess sodium bicarbonate/water and extracted several times with methylene chloride. The organic extracts were washed to neutral with water and dried and the solvents were distilled off 1.24 g of oily 19-carboxymethylene-periplogenin-5β-lactone-6-8-[2'-acetoxymethylene]-tetrahydropyranoside (6') were obtained and used without further treatment for the subsequent hydrolysis reaction. (Part of this oil was digested with ether, whereby it started crystallizing. Typical IR bands of the crystals separated by filtration were as follows: 3490, 1775, 1710-1740 (broad), 1620 (strong), several bands at 1010-1110 1 cm$^{-1}$).

b. 1 g of the oily product obtained was dissolved in 10 ml of abs. methanol for hydrolysis. At boiling heat, a solution of 255 mg of potassium bicarbonate in 2.55 ml of water was added thereto and the reaction mixture was fluxed for fifteen minutes. The mixture was then poured onto 100 ml of water and extracted several times with chloroform. After washing with water and drying, the sovlent was distilled off and the residue was digested with ether, whereby crystallization started. After filtering off the crystals, 724 mg of 19-carboxymethylene-periplogenin-5β-lactone-3-[2'-oxymethylene]-tetra-hydropyranoside-(6') were obtained melting at 175° - °C.

Typical IR bands: 3460, 1775, 1710–1740 (broad), 1620, several bands at 10 10 – 1110 cm$^{-1}$. UV λ max 3215 μ, ε = 22 100.

EXAMPLE 4 a. A solution of 2 g of 19-carboxmethylene-periplogen-5β-lactone (prepared as described in Example 2a) in 14 ml of abs. tetrahydrofurane (in case of low solubility in tetrahydrofurane and adequate amount of methylene chloride was added) was mixed with 2,8 ml of diacetyl-1-rhamnal and 4 droplets of phosphorus oxychloride. After standing or stirring for two hours at 20°c, the dark colored reaction mixture was poured into 200 ml of water containing an excess of sodium bicarbonate. After repeated extraction with chloroform, the extracts were washed to neutral, dried and the solvent was distilled off. The so-obtained residue was digested with ether, whereupon it crystallized. 3.05 g of 19-carboxy-methyleneperiplogenin-5β-lactone-3-[4'-acetoxy-2'-desoxy-3'(2') -anhydro-]-L-rhamnoside were obtained melting at 221° – 231°C. After recrystallization in methylene chloride/ether, the melting point was 265° – 267°C.

Typical IR bands: 3485, 1775, 1730–1740, 1615, 1230 (strong) 1020 cm$^{-1}$.
UV λ max = 215 – 216 μ, ε = 26 500 b. 2.2 g of the reaction product obtained according to Example a) having a melting point of 265°–267°C were dissolved for hydrolysis in 70 ml of abs. methanol. At boiling heat a solution of 660 mg of potassium bicarbonate in 6.6 ml of water was added thereto and the reaction mixture was refluxed for 15 minutes. The mixture was then poured into 250 ml of water. After an analogous work up as disclosed in Example 3, after digestion with ether, 1.9 g of 19-carboxymethylene-periplogenin-5β-lactone-3-[2'-desoxy-3'(2')-anhydro-L-rhamnoside were obtained which after reprecipitation in acetone/ether melted at 202°–208°C.

Typical IR bands: 3450, 1775, 1700 – 1740 (broad), 1615, 1025 cm$^{-1}$.
UV λ max = 215–216 μ, ε = 23 300
$[\alpha]_D^{20}$ = +4° (c = 0.5: HCCl$_3$)

EXAMPLE 5

19-carboxymethylene-periplocymarin-5β-lactone 0.3 ml of caromethoxymethyldiethylphosphonate were added dropwise to a suspensioni of 18 mg of sodium hydride in 1 ml of abs. tetrahydrofurane. When H$_2$ formation had ceased, a solution of 130 mg of dry cymarin (crude, for pharmaceutical purposes) in 2 ml of abs. tetrahydrufurane was introduced. After stirring for four and a half hours at 20°C, the reaction mixture was worked up as indicated in Example 2, 245-mg of an oil were obtained which was chromatographed on Al$_2$O$_3$, Woelm, neutral, active stage II, (h = 5.0 = 2cm). By means of benzene, oily non-crystallizing accompanying substances were first isolated. With methylene chloride/methanol in the ratio 1:1 an oil was obtained, which crystallized after digestion with ether. After reprecipitation in acetone/ether, 19-carboxymethylene-periplocymarin-5β-lactone was obtained melting at 175° – 181°C (untypical, after previous sintering).

Typical IR bands: 3470, 1775, 1750 (shoulder), 1730, 1715 (shoulder, 1615, 1250-1265 (weak), several bands situated between 1000 and 1155 cm$^{-1}$, nor more bands at 2650 cm$^{-1}$.

UV: λ max = 216 , ε = 19 150

EXAMPLE 6

19-carboxymethylene-periplogenin-5β-lactone-3-l-rhamnoside

To a solution of 3 g of 19-carboxymethylene-periplogenin-5β-lactone in 54 ml of absol. dioxane, 60 ml of absolute benzene were added with 4.2 g of freshly prepared silver carbonate. While stirring, 48 ml of benzene were distilled from the mixture. Then, while stirring and continuously distilling off benzene, a solution of 8.1 g of acetobromo-l-rhamnose in 900 ml of absolute benzene was added dropwise in the same mixture as benzene was distilled off. At 30-minute intervals after the beginning of the addition, further 0.2 g portions of silver carbonate were added to the reaction mixture (8 times 0.2 g in total), whereupon stirring was continued for another hour and the remaining benzene was distilled off up to a volume of residue of 60 ml. The reaction mixture was then allowed to cool. mixed with chloroform, the undissolved silver salts were filtered off, washed thoroughly with chloroform and the solvent was distilled off from the combined chloroform extracts. The 11 g of foam which remain were digested with ether. After filtration, 6 g of an amorphous product were obtained which were used without further treatment in the subsequent, hydrolysis. For this purpose the filter residue (6g) was dissolved) in 120 ml of absol. methanol, 60 ml of saturated ammonia solution in absolute methanol were added thereto, and the reaction solution was left for 17 hours at 5°C. Subsequently, the methanol was distilled off in vacuo to a large extent, the residue mixed with 200 ml of water, and the aqueous phase extracted successively with 80 ml of benzene, 80 ml of chloroform and four times with 100 ml of chloroform/ethanol (ratio 3 : 1). After distilling off the solvents of the chloroform/ethanol 3 : 1 extracts, 1.7 g of a foamy residue were obtained which crystallized after rubbing with ether. After filtration, there resulted in 1.5 g of 19-carboxymethylene-periplogenin-5β-lactone-3-L-rhamnoside melting at 200° – 202°c. The melting point rose, after reprecipitation in acetone/ether, to 208° – 210°C.

Typical IR bands (in KBr): 3440–3460 (broad), 1775, 1740 (broad), 1705 (broad), 1620, 1065, 1040, 1.15 cm$^{-1}$.

EXAMPLE 7

19-carboxymethylene-periplogenin-5β-lactone-3-[2'-desoxy-3'(2')-anhydro]-D-glucosidee 2 g of 19-carboxymethylene-periplogenin-5β-lactone were reacted in 14 ml of absolute tetrahydrofurane with 4 g of triacetylglucal and 4 droplets of phosphorus oxychloride in the manner described in Example 4 a) and worked up. The foamy residue (6 g) resulting at work up was used without further treatment in the subsequent hydrolysis. For this purpose it was dissolved in 206 ml of methanol and, after addition of 1.92 g of potassium bicarbonate in 19.2 ml of water, refluxed for 15 minutes. It was then poured into 700 ml of water. By analogous work up as in Example 3, after digestion with ether, 1.64 g of 19-carboxymethylene-periplogenin-5β-lactone-3-[2'-desoxy-3'(2')-anhydro-D-glucoside]melting at 156° – 160°C were obtained.

Typical IR bands (in KBr): 3440 (broad) 1775, 1735, 1715, 1620, 1070, 1020 cm$^{-1}$ UV: λ max = 216 μ, ε = 24 100

EXAMPLE 8

19-cyanomethylene-periplogenin-3-[2'-desoxy-3'(2')-anhydro-L-rhamnoside]

a. 600 mg of 19-cyanomethylene-periplogenin were dissolved in 5.2 ml of absol. tetrahydrofurane and, after addition of 0.76 ml of diacetyl-L-rhamnal and 7 droplets of phosphorus oxychloride, left for 2 hours at room temperature and worked up, subsequently, in the manner disclosed in Example 4 a). The obtained foamy residue was digested with ether. It yielded, after filtration, 687 mg of 19-cyanomethylene-periplogenin-3-[2'-desoxy-3'(2')-anhydro-L-rhamnoside-4'-acetate] melting at 153°– 156°C.

Typical IR bands: 3500, 2220, 1775, 1750–1735, 16y15, 1230, 1020, 740 cm⁻¹

UV: λ max = 213 μ, ε = 22 900 b. 600 mg of the reaction product obtained were dissolved for hydrolysis in 19 ml of methanol and mixed at boiling heat with a solution of 180 mg of potassium bicarbonate in 1.8 ml of water. After being refluxed for 25 minutes, the reaction mixture was buffered, to a pH of 5–6 with about 0.11 ml of glacial acetic acid. The methanol was distilled off in vacuo and 20 ml of half-saturated sodium chloride solution were added to the residue. After some time, the so-obtained precipitate was filtered off, washed and dried. 437 mg of crystalline 19-cyanomethylene-periplogenin-3-[2'-desoxy-3'(2')-anhydro-L-rhamnoside] were obtained which, after recrystallization from acetone/ether melted at 175° –0 178°C.

Typical IR bands: 3480 (broad), 2220, 1780, 1740, 1620, 1020, 990, 740 cm⁻¹.

UV: λ max = 214 μ, ε = 23 100

EXAMPLE 9

19-cyanomethylene-periplocymarin 130 mg of cymarin (raw, for pharmaceutical purposes, of the firm Roth, Karlaruhe) were reacted as described in Example 5 (instead with carbomethoxymethyldiethylphosphonate) with 0.3 ml of cyanomethylidiethylphosphonate and worked up analogously. Analogous chromatography on aluminum oxide yielded an oil which, after digestion with ether, also crystallized. After reprecipitation in acetone/ether, 19-cyanomethylene-periplocymarin was obtained melting at 184° – 187°C.

Typical IR bands: 3470, 3480, 2220, 1775, 1745–1730, 1620, 1070, 1020 cm⁻¹

UV: λ max = 215 μ, ε = 20 200.

We claim:

1. A 19-alkylene-14β-hydroxy cardenolide of the formula

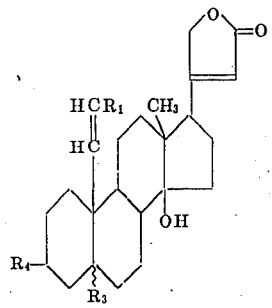

wherein $R_1$ taken alone is —CN, or taken together with an —OH group in the 5-position, forms a lactone ring; $R_3$ is 5α—H, 5β—H, or 5β—OH; and $R_4$ is —OH, 3-tetrahydropyranyl ether, or a 6-membered cyclic monosaccharide.

* * * * *